US008346582B1

(12) United States Patent
Davis et al.

(10) Patent No.: US 8,346,582 B1
(45) Date of Patent: Jan. 1, 2013

(54) SYSTEM FOR FACILITATING A PROJECT BETWEEN CONTRACTORS AND OWNERS

(76) Inventors: Dick Davis, Omaha, NE (US); Roland Partida, Cedar Creek, TX (US); Maurtice Rosemond, Omaha, NE (US); Sarah Starks, Omaha, NE (US)

( * ) Notice: Subject to any disclaimer, the term of this patent is extended or adjusted under 35 U.S.C. 154(b) by 2792 days.

(21) Appl. No.: 10/900,820

(22) Filed: Jul. 28, 2004

(51) Int. Cl.
*G06F 17/60* (2006.01)

(52) U.S. Cl. ...................................................... 705/7.11

(58) Field of Classification Search .............. 705/8, 7.11
See application file for complete search history.

(56) References Cited

U.S. PATENT DOCUMENTS 6,567,784 B2 * 5/2003 Bukow ......................... 705/7.14
6,581,040 B1 * 6/2003 Wright et al. ..................... 705/8
2005/0033628 A1 * 2/2005 Alverson et al. ................ 705/10

OTHER PUBLICATIONS

JW Bond Consultants, Inc. http://web.archive.org/web/20031004095324/http://www.jwsuretybonds.com/ Available on Oct. 4, 2003.*

Collier (Measuring the Performance of R&D Departments), Mar. 1977, Research Management, vol. 20, pp. 30-34.*

* cited by examiner

*Primary Examiner* — Romain Jeanty
(74) *Attorney, Agent, or Firm* — Holland & Hart LLP

(57) ABSTRACT

A system for facilitating a project between owners and contractors. The system includes a program for receiving owner, project and contractor data. The program determines a contractor rating for each of a plurality of contractors and a project rating for at least one project. The program then identifies contractors having a contractor rating that is compatible with the project rating. The program may further provide notifications, bid letting support, project finance support, project scheduling assistance, construction support and/or bond acquisition support.

25 Claims, 25 Drawing Sheets

SYSTEM FOR FACILITATING A PROJECT BETWEEN CONTRACTORS AND OWNERS

Your Petitioners, DICK DAVIS, a citizen of the United States and a resident of the State of Nebraska, whose post office address is 1626 North 137$^{th}$ Street, Omaha, Nebr. 68154, and ROLAND PARTIDA, a citizen of the United States and a resident of the State of Texas, whose post office address is Route 2 Box 2233, Cedar Creek, Tex. 78612, and MARK NEWSON, a citizen of the United States and a resident of the State of Nebraska, whose post office address is 14727 Calhound Road, Omaha, Nebr. 68152, and MAURTICE ROSEMOND, a citizen of the United States and a resident of the State of Nebraska, whose post office address is 1210 North 26$^{th}$ Circle, Omaha, Nebr. 68131, and SARAH STARKS, a citizen of the United States and a resident of the State of Nebraska, whose post office address is 3802 North 53$^{rd}$ Street, Omaha, Nebr. 68104, prays that Letters Patent may be granted to them for the invention set forth in the following specification.

FIELD OF THE INVENTION

The present invention relates generally to a system for facilitating a project between owners and contractors. More specifically, the present invention relates to a system for identifying compatible contractors and owner projects and facilitating the contract process between the parties.

BACKGROUND OF THE INVENTION

When undertaking a new project, such as a construction project, an owner usually contacts a prime contractor or one or more subcontractors to perform the project. In the building industry, for example, a perspective owner may contact a prime contractor and convey to the prime contractor ideas regarding a new building. The prime contractor or an architect will then draft building plans and contact subcontractors to bid on various tasks to complete the building.

The contractor or owner must ensure that each of the contractors has the correct bonding (if necessary) or finances to complete the various tasks required to finish the building. The owner and/or prime contractor is also responsible for providing the subcontractors with change order notifications, bid letting notifications, project award notifications, and scheduling information. Also, the owners and/or prime contractors have to research various subcontractors to ensure that they are competent to complete the project. This research and notification process can be very costly, ineffective and time consuming. Furthermore, such research may not reveal the best subcontractor for a particular task.

An owner or prime contractor may also favor certain subcontractors or only rely on a few competent subcontractors for a plurality of projects. This may result in only a few subcontractors receiving all of the projects in a particular area. Such favoritism is disadvantageous to up-and-coming subcontractors and certain minority subcontractors. Accordingly, a need exists for an automated database system for identifying compatible subcontractors and projects. A need also exists for a system that facilitates the working relationship between the owner, primary contractor and subcontractors during the progression of a project.

SUMMARY OF THE INVENTION

The present invention is directed to a system for facilitating a project between owners and contractors. The system comprises a program which may be operative on software, hardware, a server, an open network, a closed network or any number of hand-held or portable user interfaces known in the art. The program may receive and store information regarding an owner, owner project and at least one contractor.

The program determines a project rating from the requirements of the project input into the project database. Such requirements might include the tasks needed to complete the project, the bonding requirements of the project, the financial requirements or the scheduling of the project. The program also determines a contractor rating from information pertaining to the contractor. Such information may include the number of contractor employees, the contractor's availability, the bondability of the contractor, the contractor's finances or the scope of the contractor's competencies. The program then identifies contractors having a contractor rating that is compatible with the project rating. The program also facilitates the progression of a project by automating the notification process between an owner and a contractor. Such notifications may occur when a project begins, during the bid letting process, upon award of a bid, during change orders or after scheduling changes. The program may also provide contractors with bond acquisition support and finance support by automating a portion of the application process and providing status information during the process.

During the bid letting portion of a project, the program may provide support by transmitting notifications, maintaining a database of materials important to the bidding process or automatically providing notifications to the owner or prime contractor of contractors willing and competent to bid on a given project. The program may also provide support throughout the project and/or construction process. Such support may include notification of schedule changes, change orders, environmental regulations, status updates and project overviews.

It is therefore a primary objective of the invention to provide a system for facilitating a project between an owner and one or more contractors.

Another objective of the invention is to provide a program for receiving and storing owner data.

Still another objective of the invention is to provide a program for receiving and storing project data.

Yet another objective of the invention is to provide a program for receiving and storing contractor data.

Another objective of the invention is to provide a program for determining a contractor project rating.

Still another objective of the invention is to provide a program for determining a project rating.

Yet another objective of the invention is to provide a program for identifying contractors having a contractor rating that is compatible with the project rating.

Another objective of the invention is to provide a system for providing automatic notifications at predetermined intervals throughout the project process.

Still another objective of the invention is to provide a system for providing bond acquisition support.

Yet another objective of the present invention is to provide a system for providing finance acquisition support.

Another objective of the invention is to provide a system for providing bid-letting support.

Still another objective of the invention is to provide a system for construction support.

These and other objects of the present invention will be apparent to those skilled in the art.

DESCRIPTION OF THE PREFERRED EMBODIMENT

In the following detailed description of exemplary embodiments of the invention, reference is made to accompanied drawings, which form a part hereof, in which is shown by way of illustration, specific exemplary embodiments of which the invention may be practiced. These embodiments are disclosed in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Figure 1:
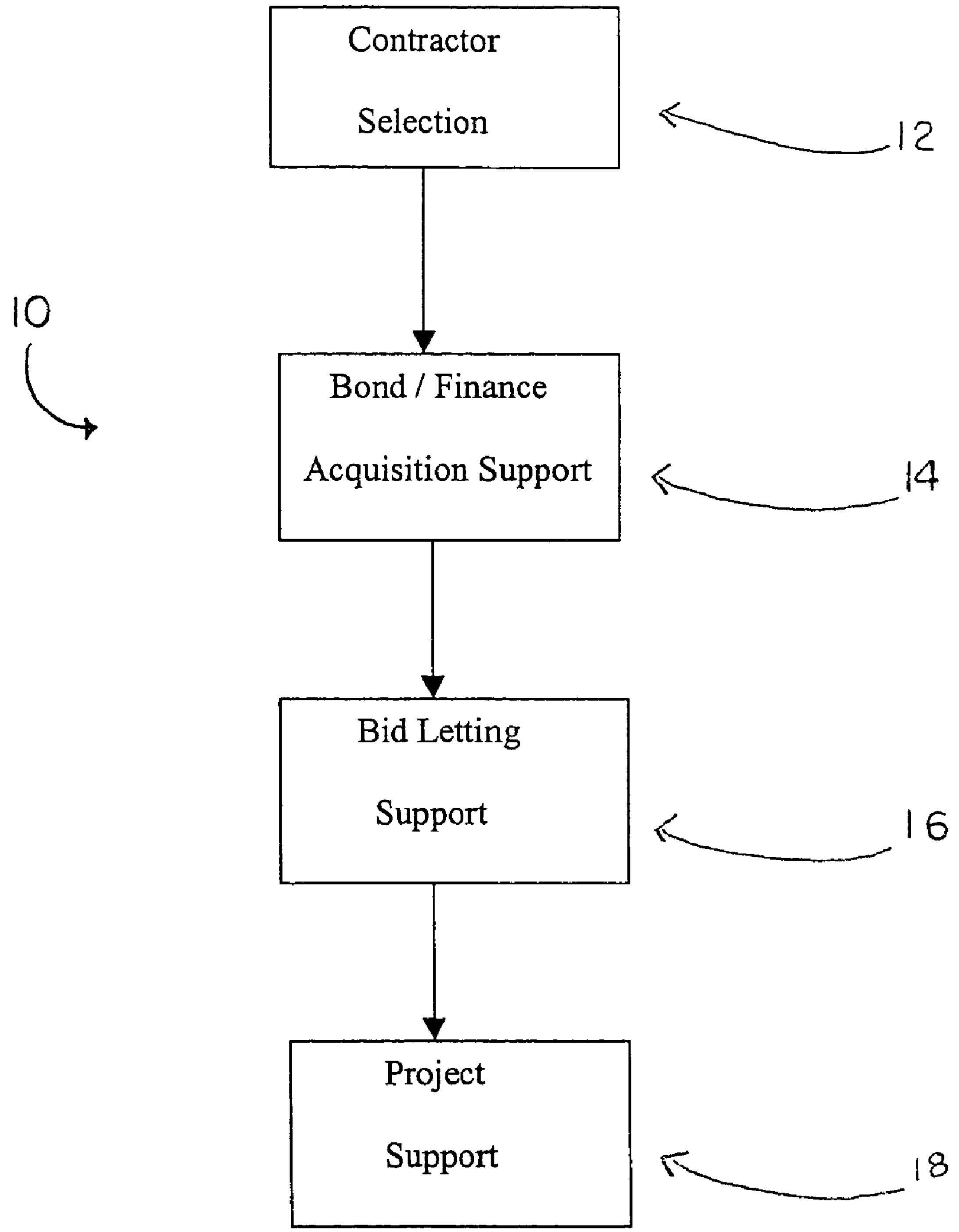
FIG. 1 is a schematic overview of the system for facilitating a project between owners and contractors.

FIG. 1 shows a system level overview of the system for facilitating a project between an owner and contractor. The system includes a program 10 for selecting a contractor 12, providing bond/finance acquisition support 14, providing bid-letting support 16 and providing project support 18. It will be understood by those of skill in the art that the program 10 may be incorporated on software, operated on a network or incorporated on a hard drive. A person of skill in the art will understand various means for implementing the program 10 on various types of user interfaces. Some types of user interfaces may include a computer, hand held processors or a server. In the situation where the program 10 is utilized in conjunction with a network, such a network may comprise any type of closed network, open network or the world wide web.

Figure 2:
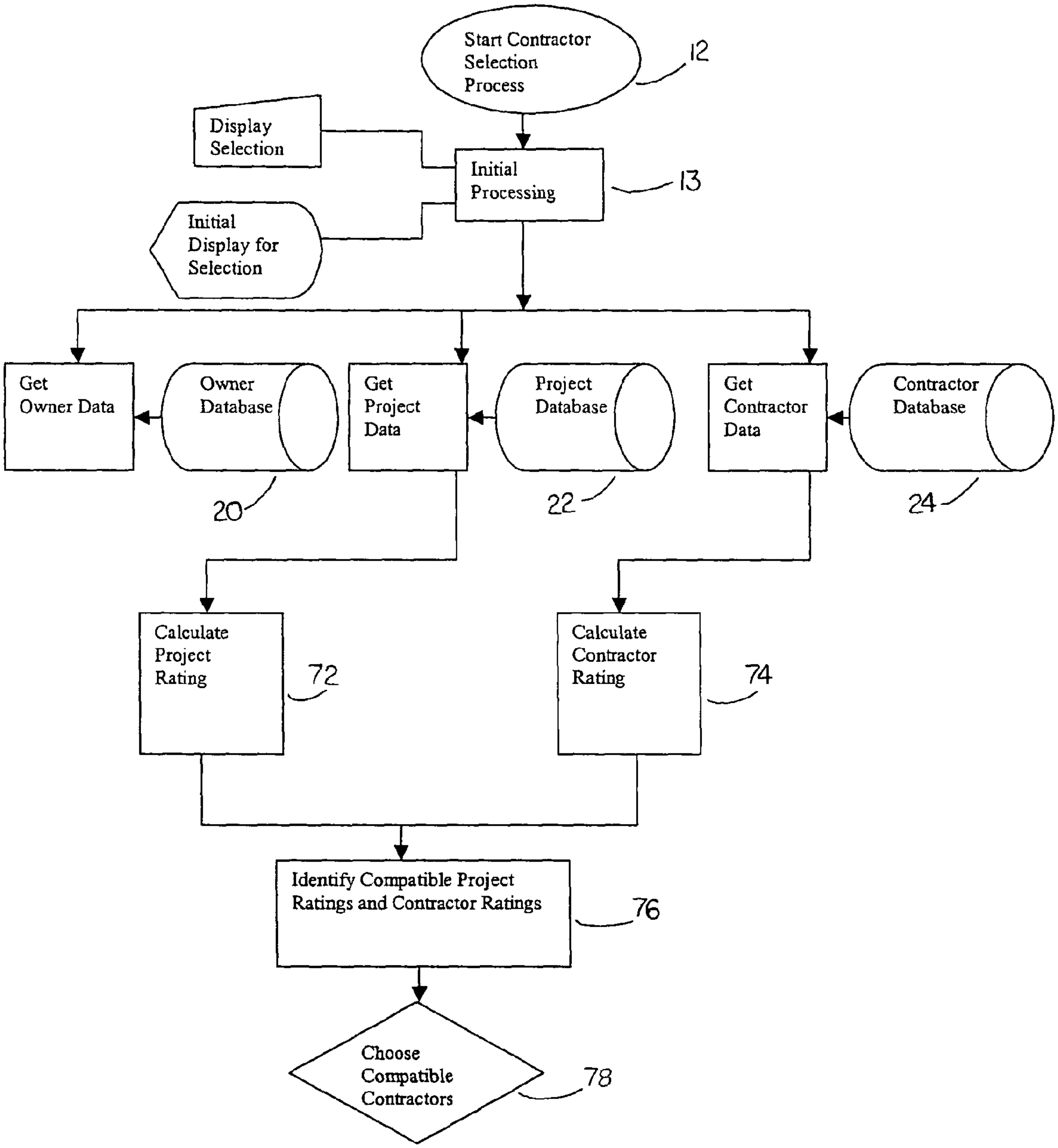
FIG. 2 is a schematic diagram illustrating the contractor selection process in one embodiment of the invention.

FIG. 2 shows a general overview of the contractor selection process 12 of the program 10. During the initial processing step 13 a user may access one or more databases using a user interface. Such databases may include an owner database 20, a project database 22 or a contractor database 24. The information stored in the databases may be previously entered data or data entered by a user as the program 10 is executed. Even though the owner database 20, project database 22 and contractor database 24 are described herein separately, it should be known that the same may comprise a single database or any combination thereof. Of necessity in the program 10 is the ability for a user to input and receive data regarding an owner, a project and one or more contractors. The specific layout of the database is not necessary to the functionality of program 10.

Regarding the owner database 20, some of the information that could be stored in the owner database 20 is depicted by the categories shown in FIGS. 6-9. The owner database 20 may include an information category 26, which may be used to enter the owner's address and contact numbers along with a description or demographic of the owner. The information category 26 may also include the owner's preferred mode of notification. For example, the owner may choose notification by e-mail, fax or printed document. A contact category 28 may be used to enter information on the point of contact at the owner's business and the departments category 30 may include information on the various departments that comprise the owner's business. The activities category 32 could store information on various projects the owner has in progress. The activities category 32 could also store information regarding the scheduling order of a specific project. Those of skill in the art will realize that the owner database 20 may maintain any data that is necessary to facilitate, expedite or manage the progression a project.

Figure 25:
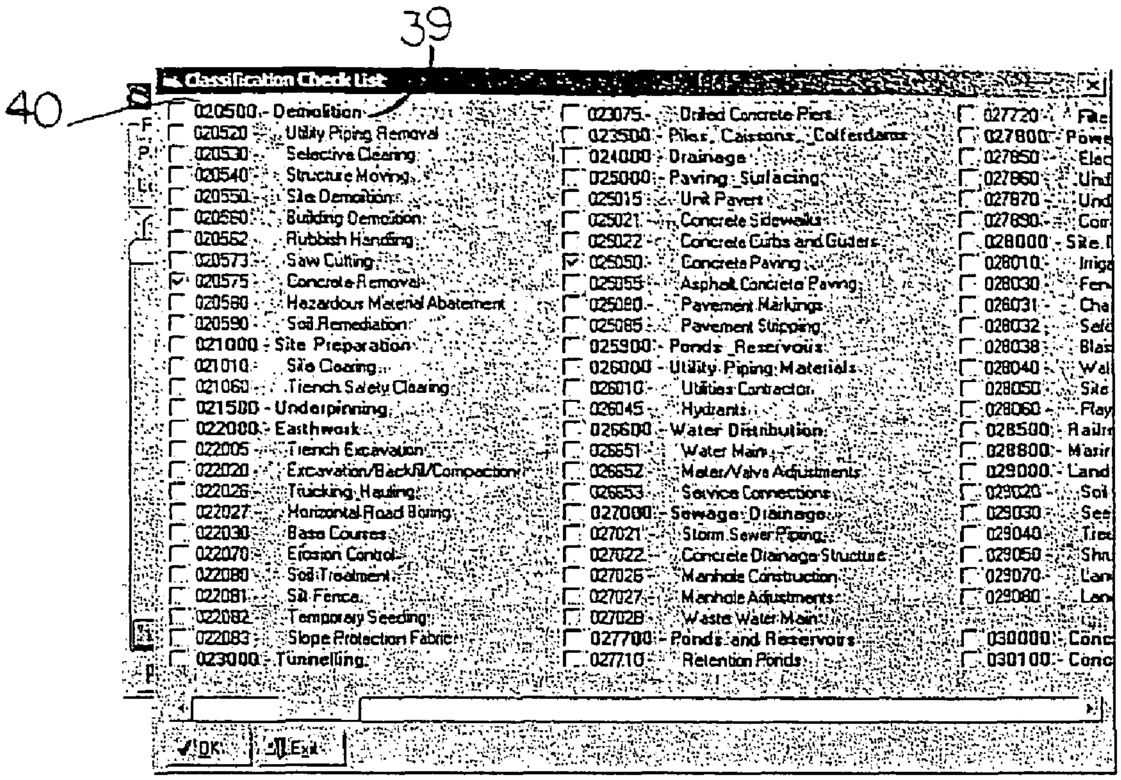
FIG. 25 depicts one possible embodiment of the task classification hierarchy list for one embodiment of the invention.

FIGS. 10-16 depict some of the categories that may be used to enter project data into the project database 22. An information category 34 may include a project description and a scheduling order for several key benchmarks of the project. An activities category 36 may include a list of specific activities for a project. The scope category 38 includes a description of the scope of the project. As shown in FIG. 25, task classifications 39 may be included in the project scope category 38 to identify various individual tasks that need to be completed to finish the owner project. Each of the task classifications 39 also include a classification number 40. The scope category 38 facilitates a project rating as will be further set forth below.

The project database 22 may also include an addenda category 40 which includes information regarding changes or additions to the project scope. A participants category 42 is also included in the project database 22, which lists all of the possible contractors who might be awarded tasks for the projects completion. The participants category 42 also contains information, status and classifications pertaining to individual contractors as will be further set forth below in relation to the contractor database 24. A primes category 46 contains information pertaining to the prime contractors who are involved in the project. The project database 22 may also include a bonding category 48 and bid category 50. The bid category 50 includes all of the information on all of the bids entered on the project and the bond category 48 includes the bonding requirements for the project. A checklist category 51 includes all of the major benchmark tasks that must be completed as the project progresses. Again, the above-stated categories are merely examples of the information the project database 22 may store. A person of skill in the art will recognize that various other types of information may be stored by the database 22 as the project progresses. Such information may include bid award information, notifications, financial information and various other types of scheduling information.

FIGS. 17-24 show some of the categories that may be used to enter information into the contractor database 24. Information category 52 includes contact information and project history information for a particular contractor. The project history of information category 52 may include prior bonding, unbonded and bonding waived projects. Category 52 may also include information on the contractor's financial institute, a description of the contractor's ethical background, gender, certifications and project capacity.

The contacts category 54 includes information regarding the point of contact in the contractor's business and activities category 56 includes information regarding the contractor's involvement with various projects. Bid/bond category 58 includes information on the contractor's bonding status. Stated another way, category 58 includes data on whether or not the contractor was able to obtain bonding for a particular project. Bid/bond category 58 also includes information regarding a contractor's bid on a particular project. Bank category 60 includes information pertaining to the contractors financials and whether or not a loan application was approved or disapproved in anticipation for a particular project. The bank category 60 may further include information pertaining to the contractor's credit line and bond lines.

The contractor database 24 also includes a scope category 62. The scope category 62 comprises information regarding the contractor's competencies. The scope category 60 includes a hierarchy of project competencies similar to the scope category 38 in the project database 22. As shown in FIG. 25, the hierarchy includes a list of task classifications 39 and classification numbers 40 assigned to each task classification. The database 24 stores a list of task classifications that the contractor is competent to perform. The scope category 62 facilitates a contractor rating as will be more fully set forth below.

The contractor database 24 may also include a bond line category 64, which includes specific information regarding the contractor's bond lines. A projects category 66 pertains to the projects that the contractor is currently involved. The database 24 might further comprise a documents category 68 which includes information regarding various construction documents necessary to complete the project. Again, the aforementioned contractor categories are merely for example purposes. A person of skill in the art will recognize that any number of categories may be implemented into the contractor database 24 as long as they are relevant to the facilitation, expedition and management of a project. Such other categories might include a notes category 70, an award/rejection category or a notification category.

The program 10 may be further operative to generate notifications to the owner, contractor, prime contractor or any other party involved in a project. The form of the notification will be in any form that a party to the project indicates in the program 10. For example, a party may choose to be notified by e-mail, fax, paper document or any combination of the same. The program will automatically generate the notifications during predetermined intervals of the project. For example, after the owner has selected a contractor, the information could be imput using the program 10 and a notification would be automatically sent to the contractor via e-mail, fax or paper document depending on the specific manner the contractor desires. Other notification events would be evident to those of skill in the art. Such events may include commencement of a project, after a change order, after an award, after a scheduling change, during bid letting or at the completion of a project.

In FIG. 2, reference numbers 72 and 74 refer to the process of calculating a project rating and a contractor rating, respectively. Globally, the program 10 "matches" or "identifies" contractors who have a contractor rating that is compatible with the project rating as indicated by reference numeral 76. In one embodiment of the program 10, an owner will specifically identify the project scope 38 by selecting from various task classification numbers 40. An owner could further choose to classify a project by requiring various levels of bonding, financial status, contractor size, contractor minority percentage or a contractor from a certain geographic region. The program 10 then "scans" the contractor database to find contractors who "match" the owner's requirements. Any number of requirements may be incorporated into the program 10. Furthermore, those of skill in the art will recognize that the "matching" or "identifying" process could occur through any number of algorithms or weighing of categories. For example, the matching process may produce a rating or number for each contractor where the contractor with the highest rating is the closest match for a particular project. Such a matching process may also include weighing certain categories so that the matching of a weighed category results in a higher overall contractor rating.

After the program 10 identifies compatible contractors, the owner and/or prime contractors are notified of the compatible contractors. Such notification may occur by means of e-mail, fax or paper document as described above. The owner and/or prime contractor may then choose those contractors who can bid on the project as indicated by reference numeral 78.

Figure 3:
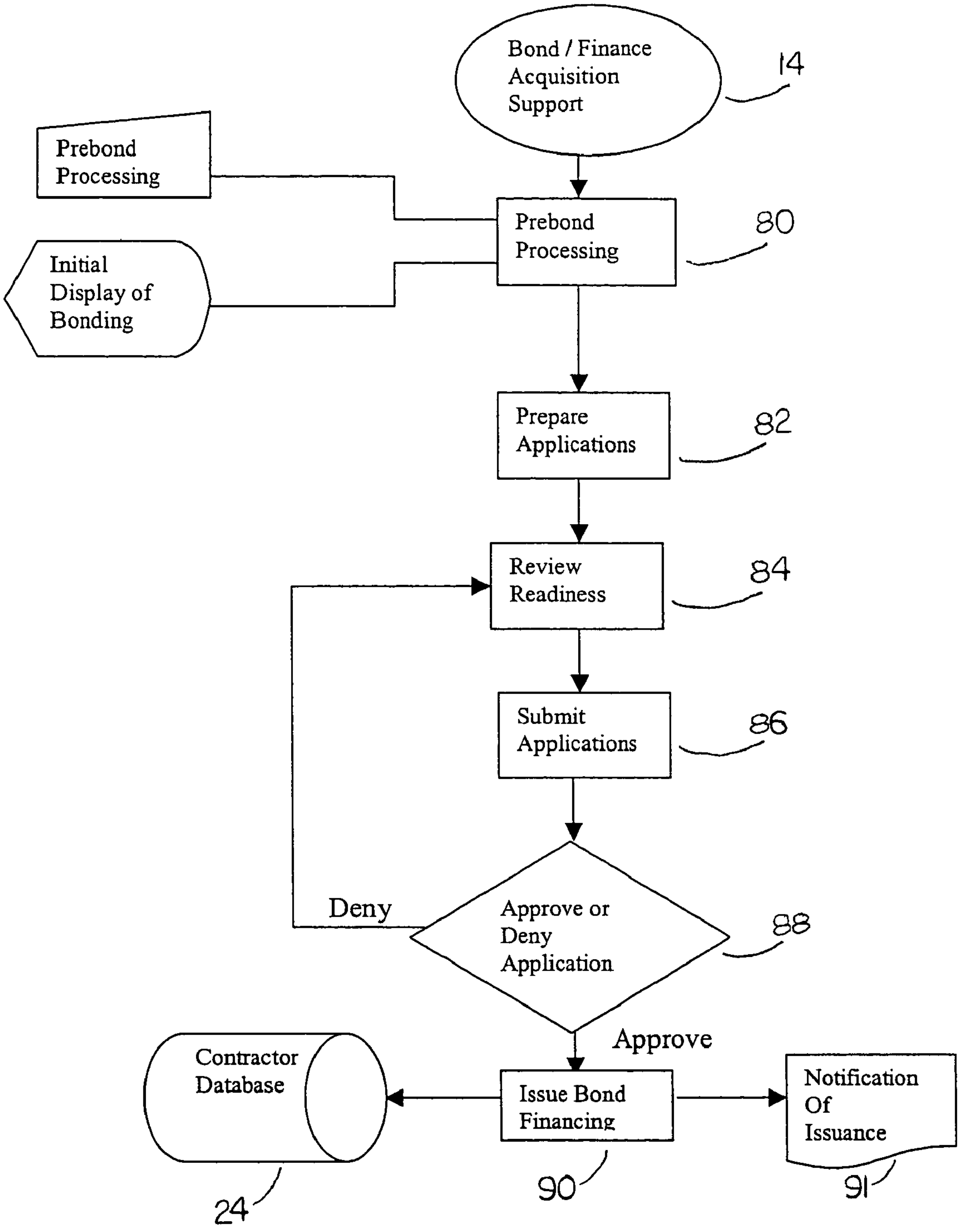
FIG. 3 is a schematic diagram illustrating the bond/finance acquisition support process in one embodiment of the invention.

In most situations, an owner will not let a contractor bid on a project unless the contractor has the required finances and bonding. In such a situation, the program 10 provides bond/finance acquisition support 14 for the contractor as indicated in FIG. 3. During the prebond processing 80, a user enters the contractors financials into the contractor database 24. The user may generate financial or bonding applications using program 10. The application may be electronic or paper depending on the requirements of the financial or bonding institute. A user or program administrator may then electronically or manually prepare the application as indicated by process step 82. The user or program administrator then reviews the application for readiness as indicated by reference number 84. The application is then submitted 86 to the appropriate institution for approval and the institute either approves or denies the application as indicated by reference numeral 88. In the situation where the application is denied, the application is sent back to process step 84 where the application is again reviewed for readiness. If the application is accepted, the bond or financing is issued as indicated by reference number 90 and the issuance of such bond and/or financing is input into the contractor's database 24. A notification may be automatically generated and transmitted to the contractor or when necessary, the owner or primary contractor as indicated by process step 91.

Figure 4:
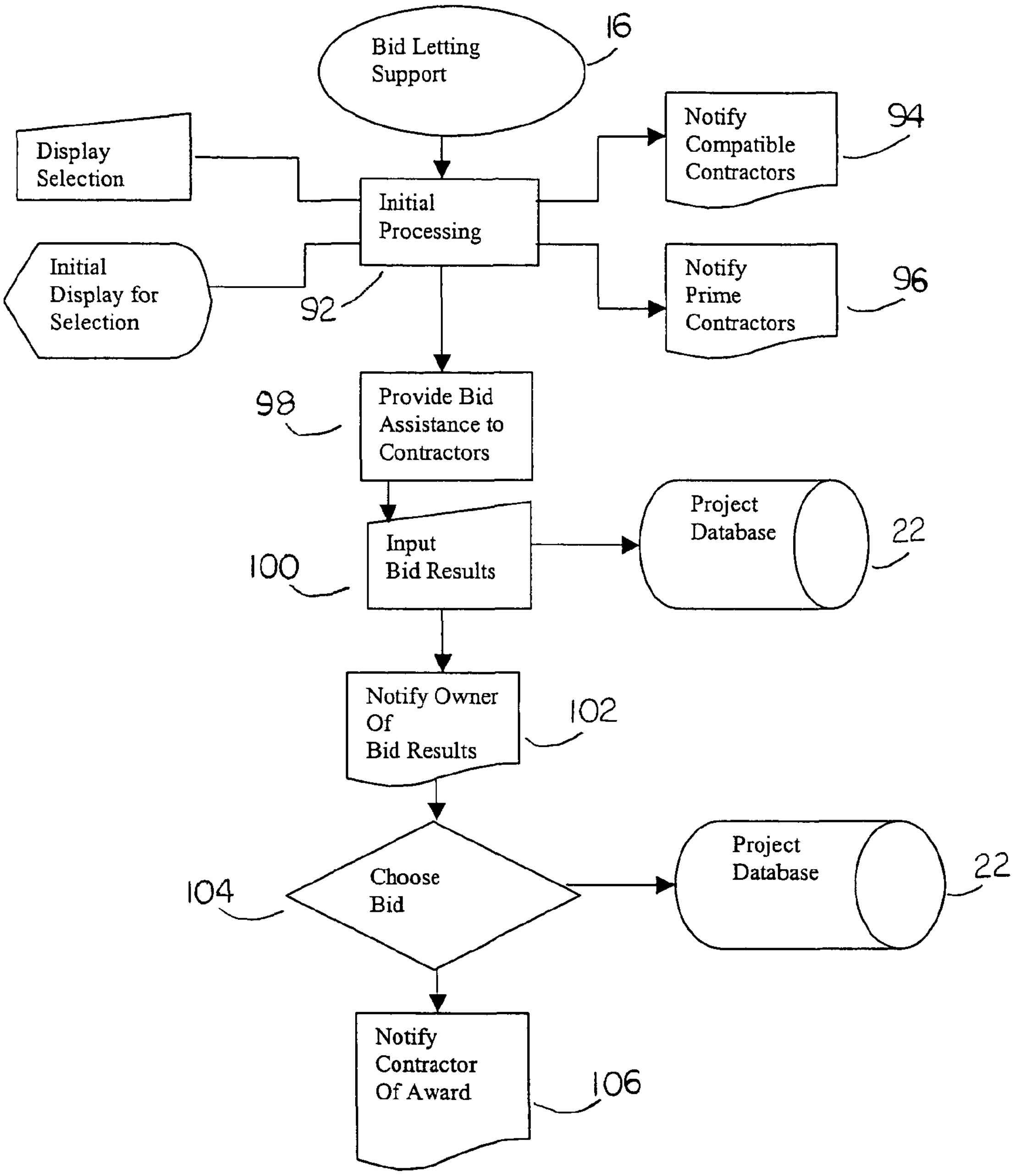
FIG. 4 is a schematic diagram illustrating the bid-letting support process in one embodiment of the invention.

FIG. 4 shows a general overview of the bid-letting support 16 provided by the program 10. During the initial processing 92, bid information may be entered or retrieved from the project database 22 and contractor database 24. Such bid information may include project specifications and bid timing along with bid submissions from various contractors. During the initial processing 92 the program 10 may generate notifications to compatible contractors and prime contractors as indicated by reference numbers 94 and 96, respectively.

The program 10 may also provide bid assistance to contractors 98 as such assistance is desired. Such assistance 98 may include a catalog of materials required for project completion, cost estimates or scheduling. Once each of the chosen compatible contractors has formulated a bid, the bids are entered into the project database 22 as indicated by reference number 100. The program 10 then generates a notification of the bid results 102 in a form that the owner desires and transmits the bid results to the owner. The owner and/or prime contractor chooses the winning bid 104 and information regarding the winning contractor is stored in the project database 22. The winning contractor may be notified as indicated by reference number 106.

Figure 5:
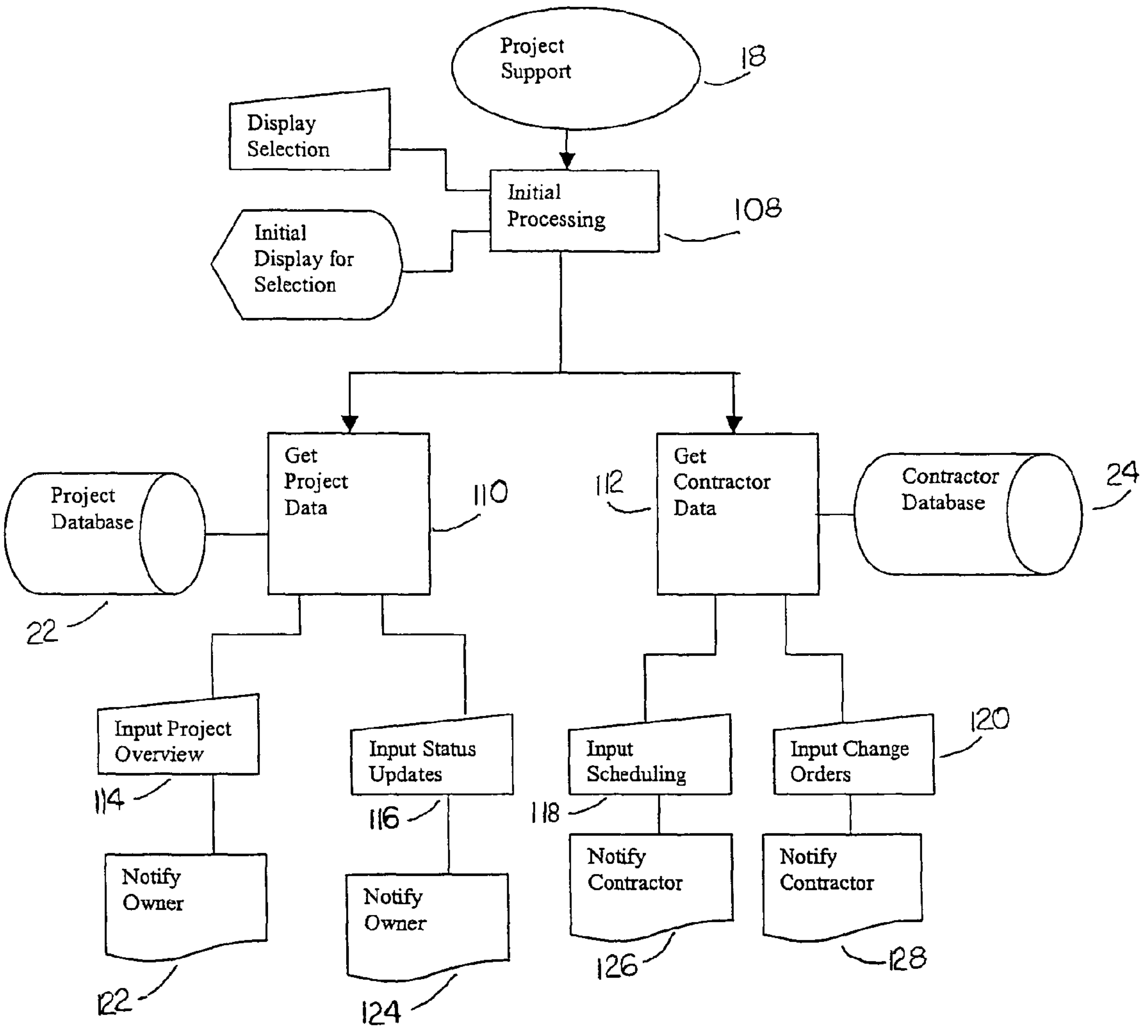
FIG. 5 is a schematic diagram illustrating the project support process in one embodiment of the invention.
Figure 6:
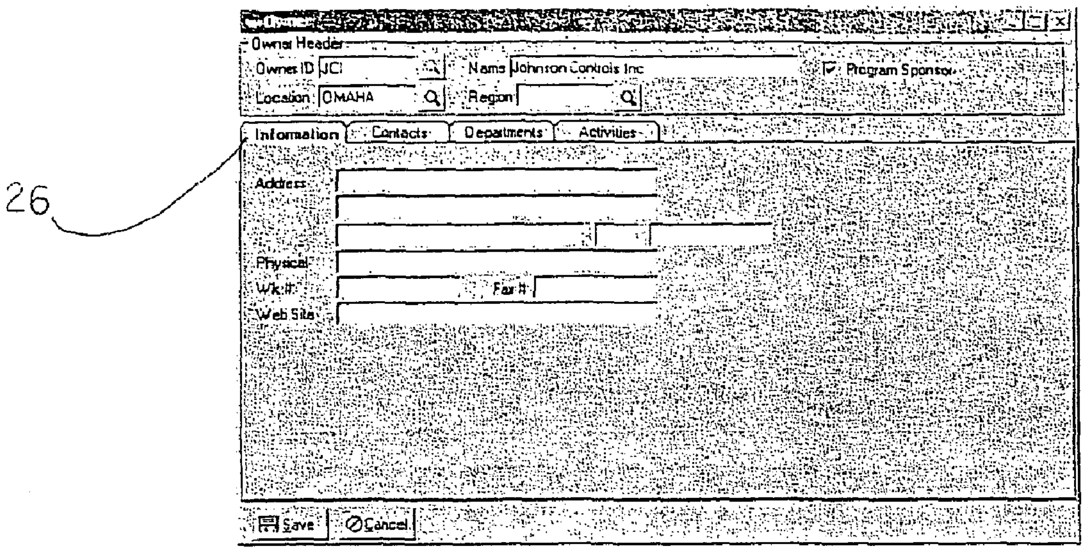
FIG. 6 depicts one possible embodiment of the information category of the owner interface.
Figure 7:
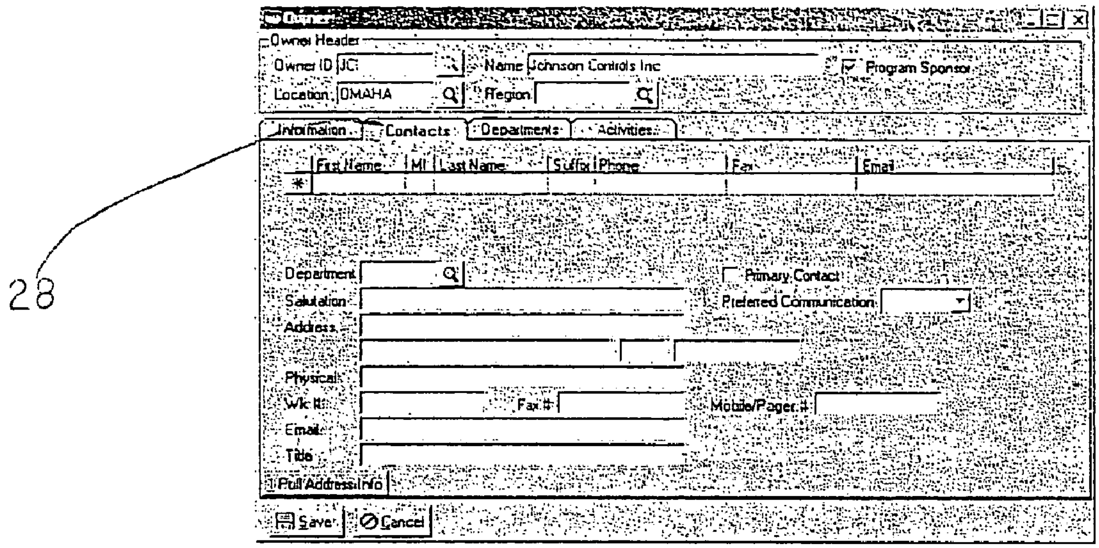
FIG. 7 depicts one possible embodiment of the contacts category of the owner interface.
Figure 8:
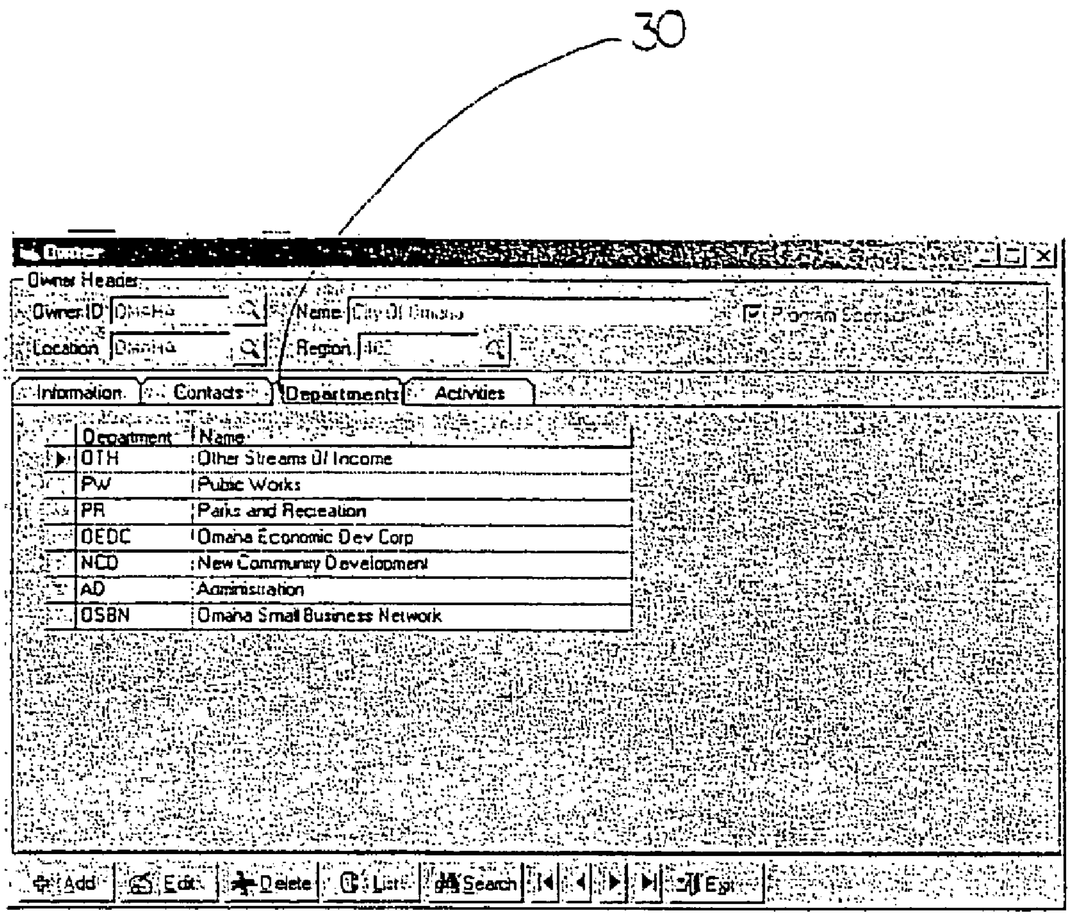
FIG. 8 depicts one possible embodiment of the department's category of the owner interface.
Figure 9:
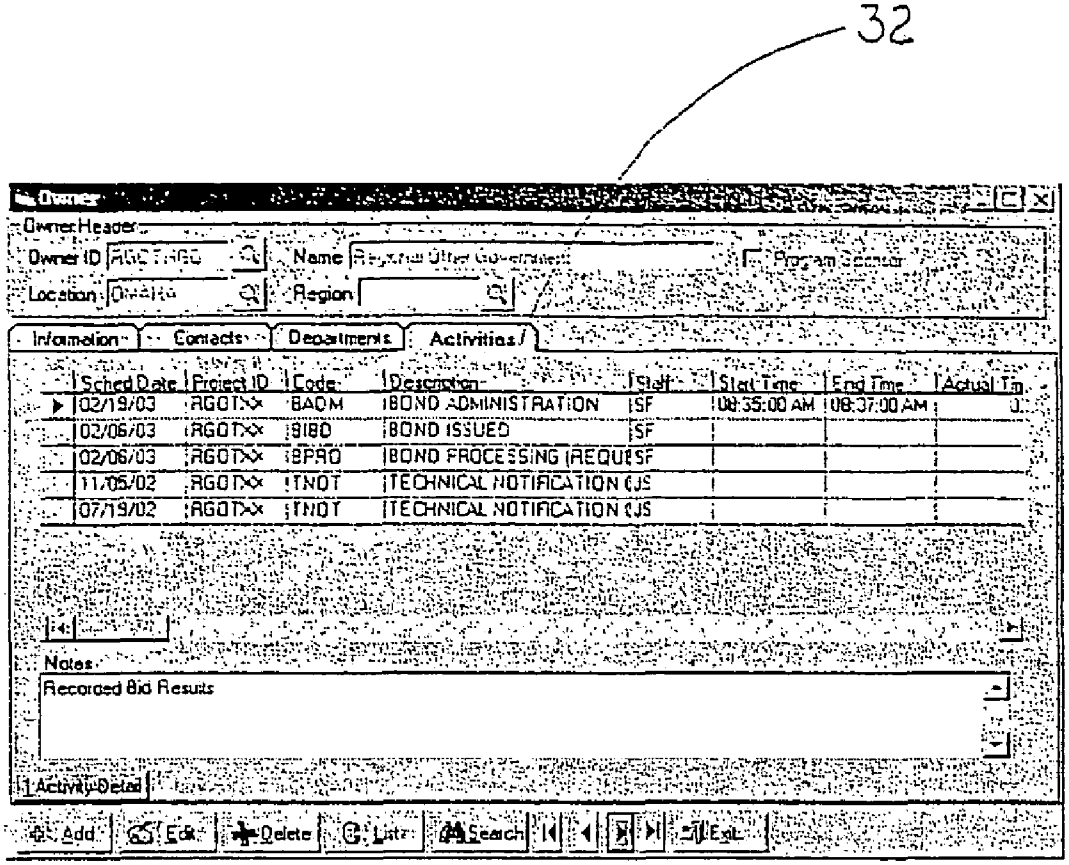
FIG. 9 depicts one possible embodiment of the activities category of the owner interface.
Figure 10:
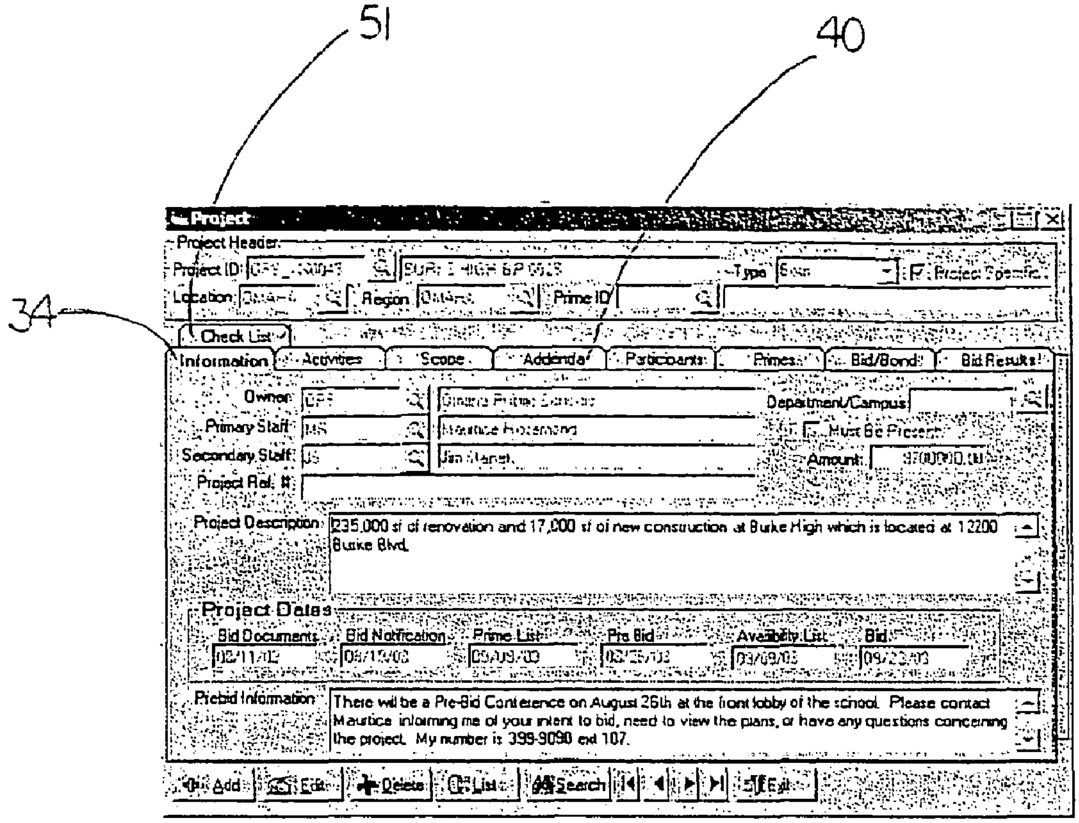
FIG. 10 depicts one possible embodiment of the information category of the project interface.
Figure 11:
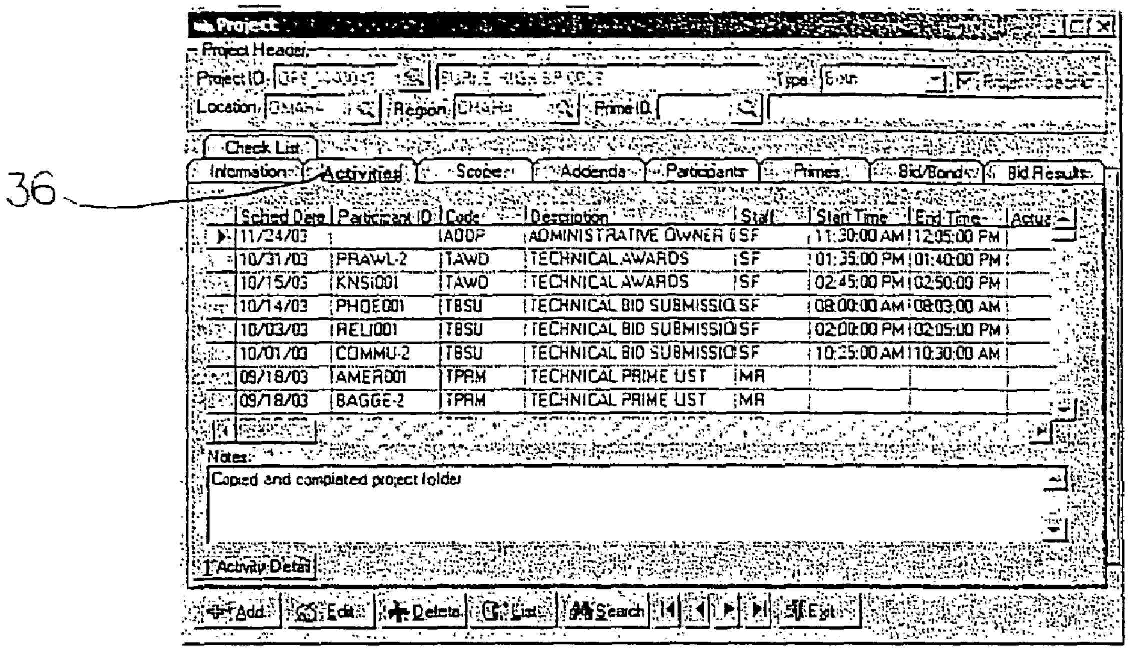
FIG. 11 depicts one possible embodiment of the activities category of the project interface.
Figure 12:
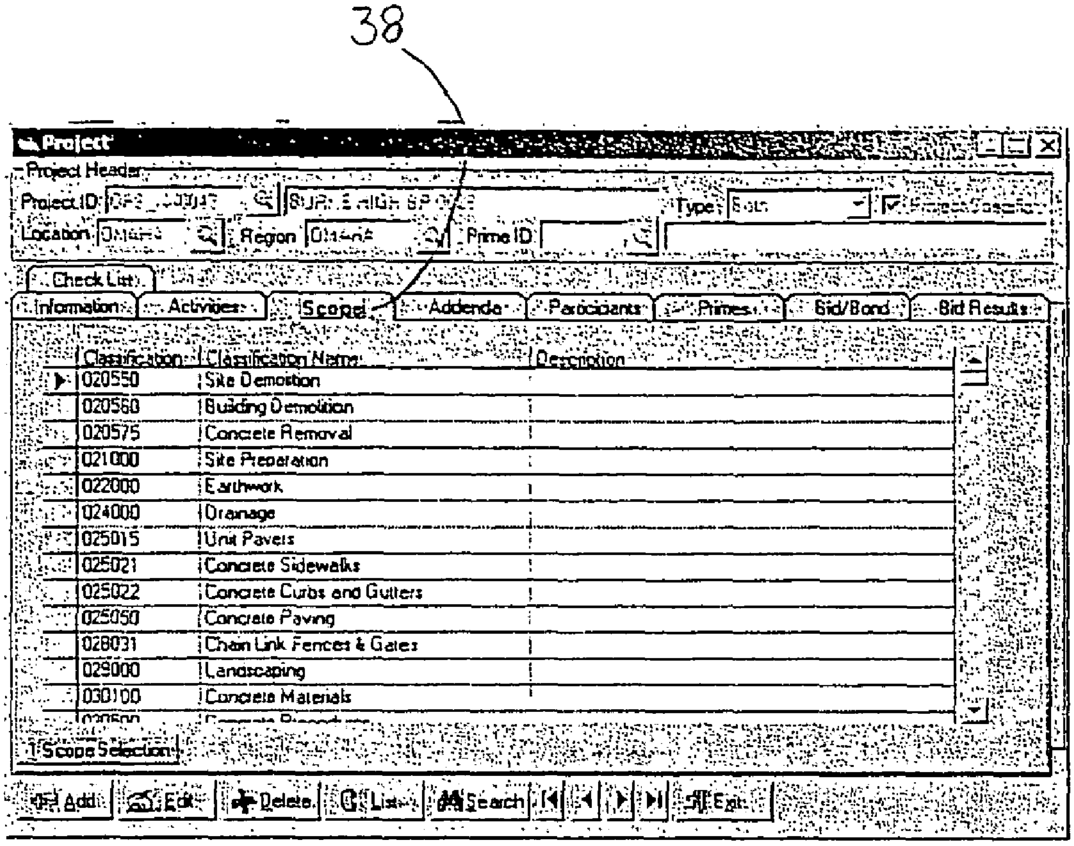
FIG. 12 depicts one possible embodiment of the scope category of the project interface.
Figure 13:
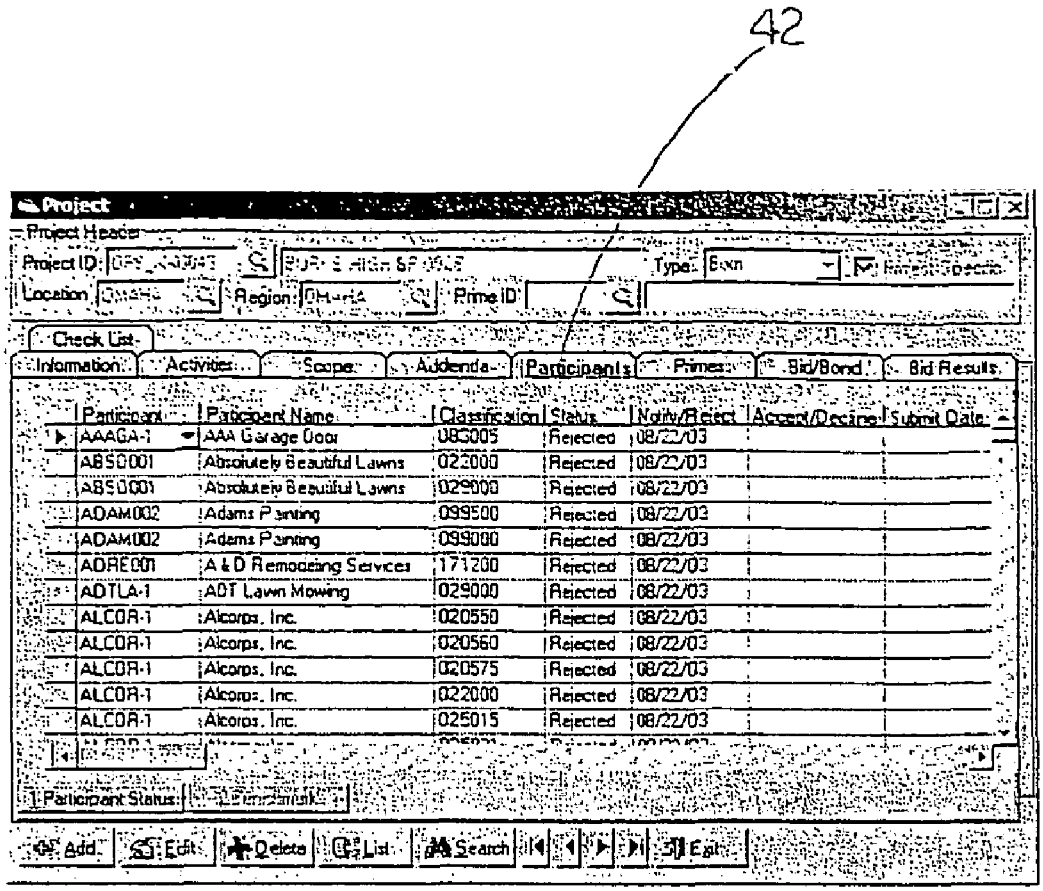
FIG. 13 depicts one possible embodiment of the participants category of the project interface.
Figure 14:
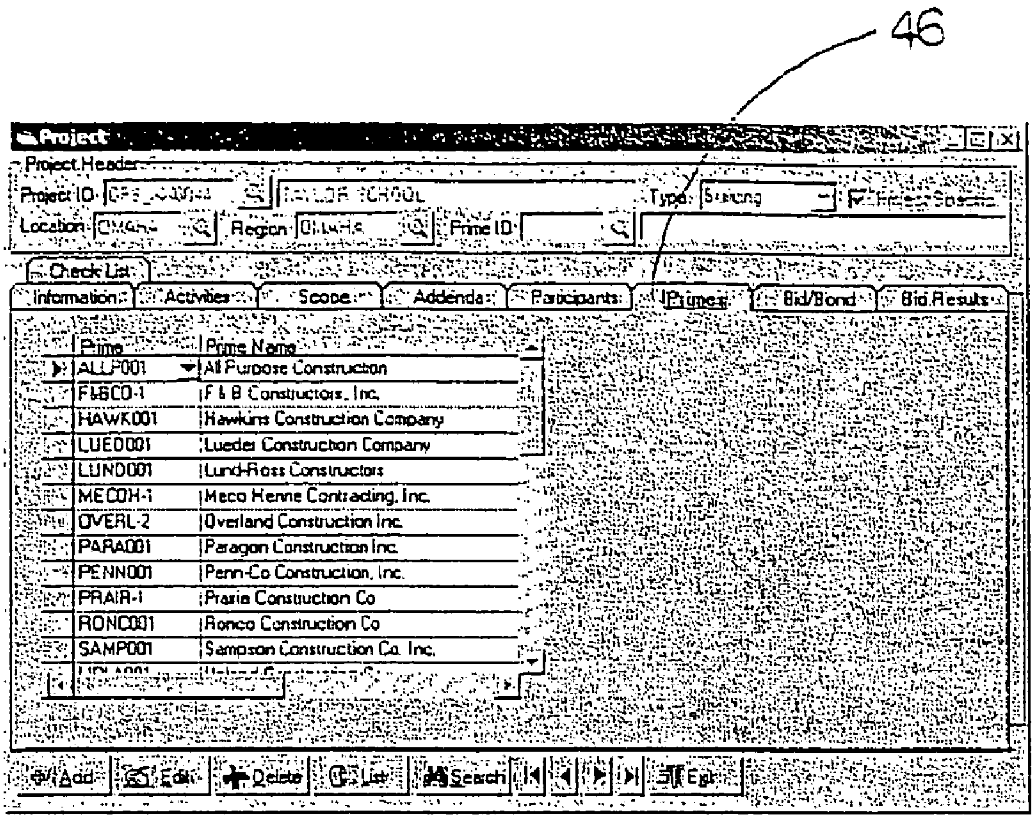
FIG. 14 depicts one possible embodiment of the primes category of the project interface.
Figure 15:
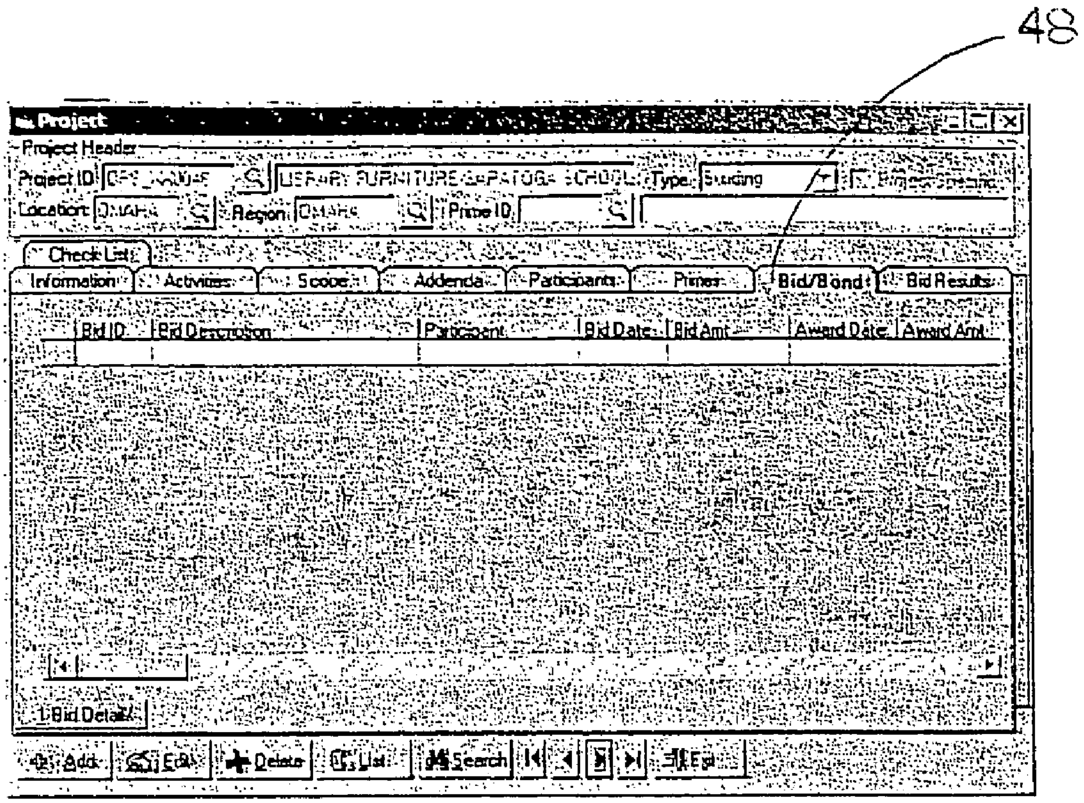
FIG. 15 depicts one possible embodiment of the bid/bond category of the project interface.
Figure 16:
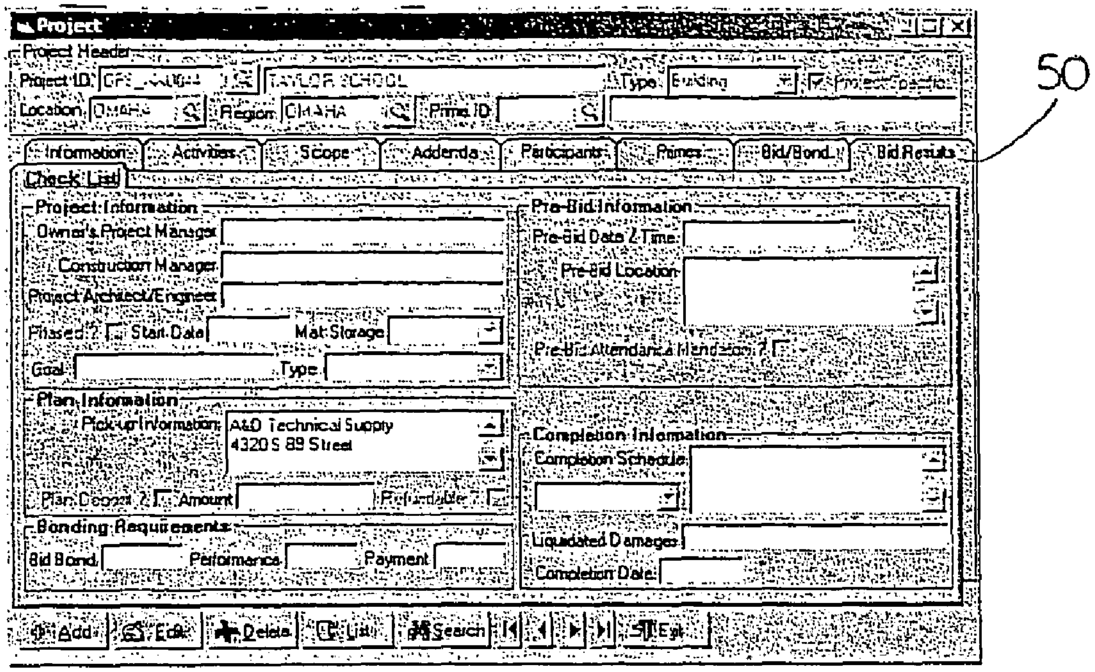
FIG. 16 depicts one possible embodiment of the bid-results category of the project interface.
Figure 17:
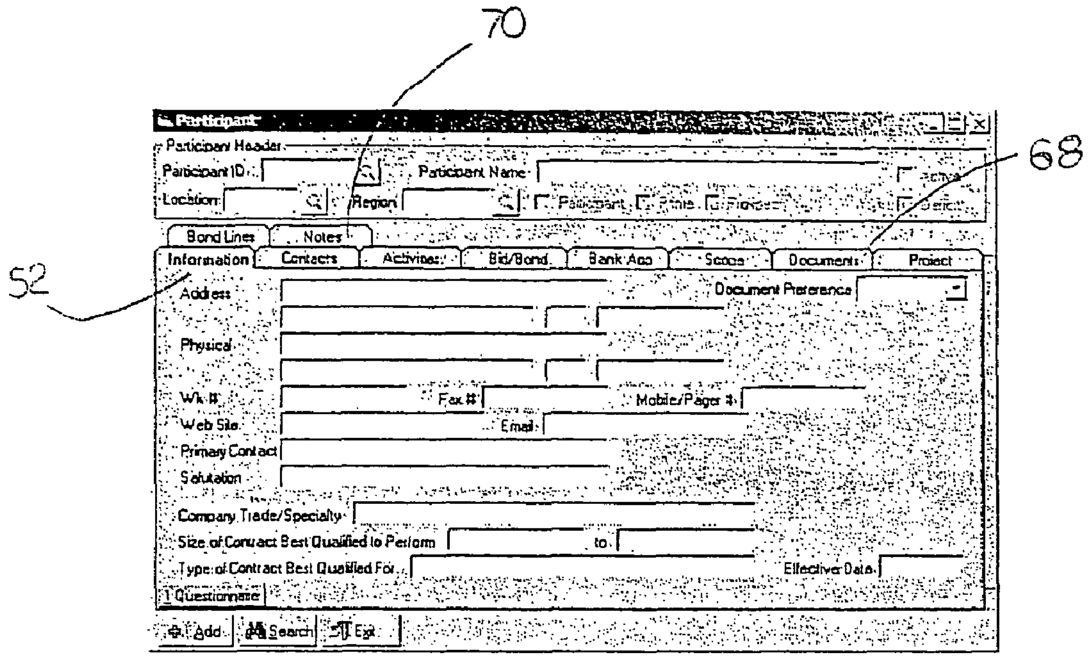
FIG. 17 depicts one possible embodiment of the information category of the contractor interface.
Figure 18:
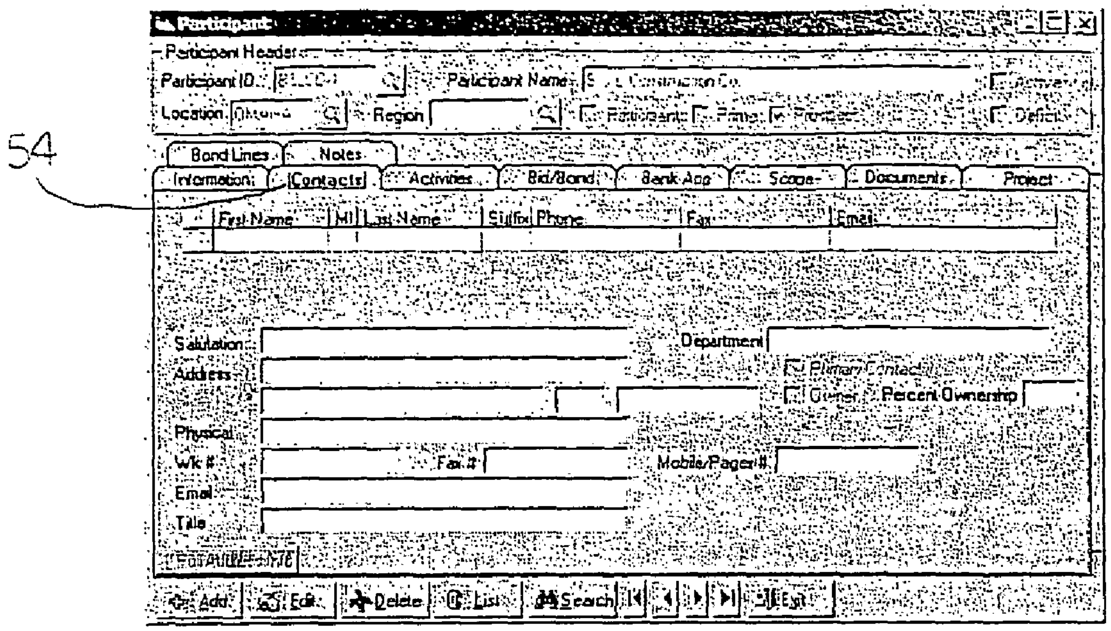
FIG. 18 depicts one possible embodiment of the contacts category of the contractor interface.
Figure 19:
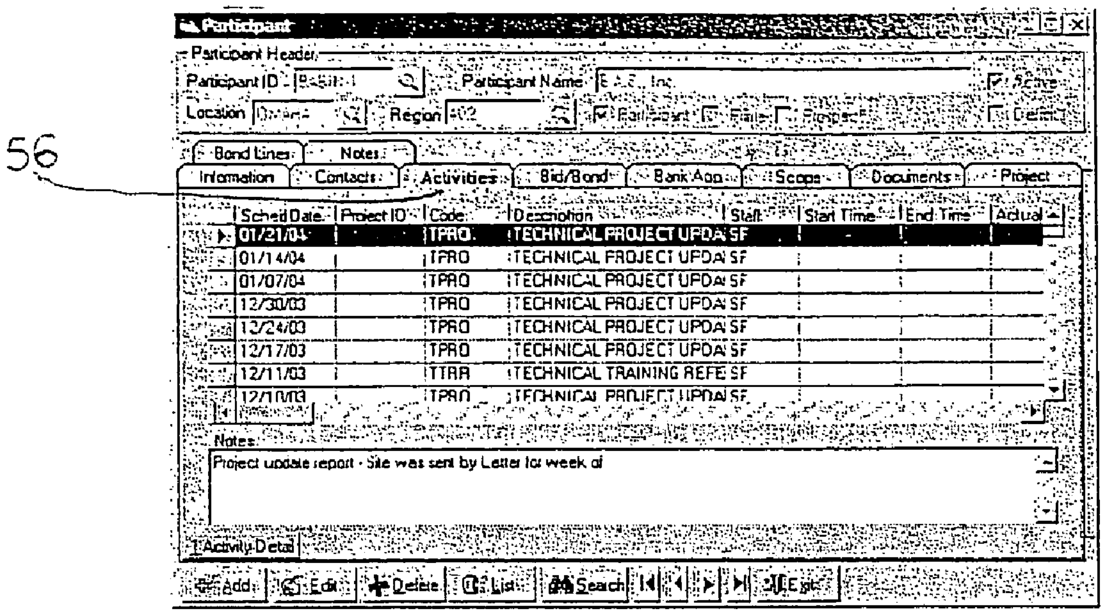
FIG. 19 depicts one possible embodiment of the activities category of the contractor interface.
Figure 20:
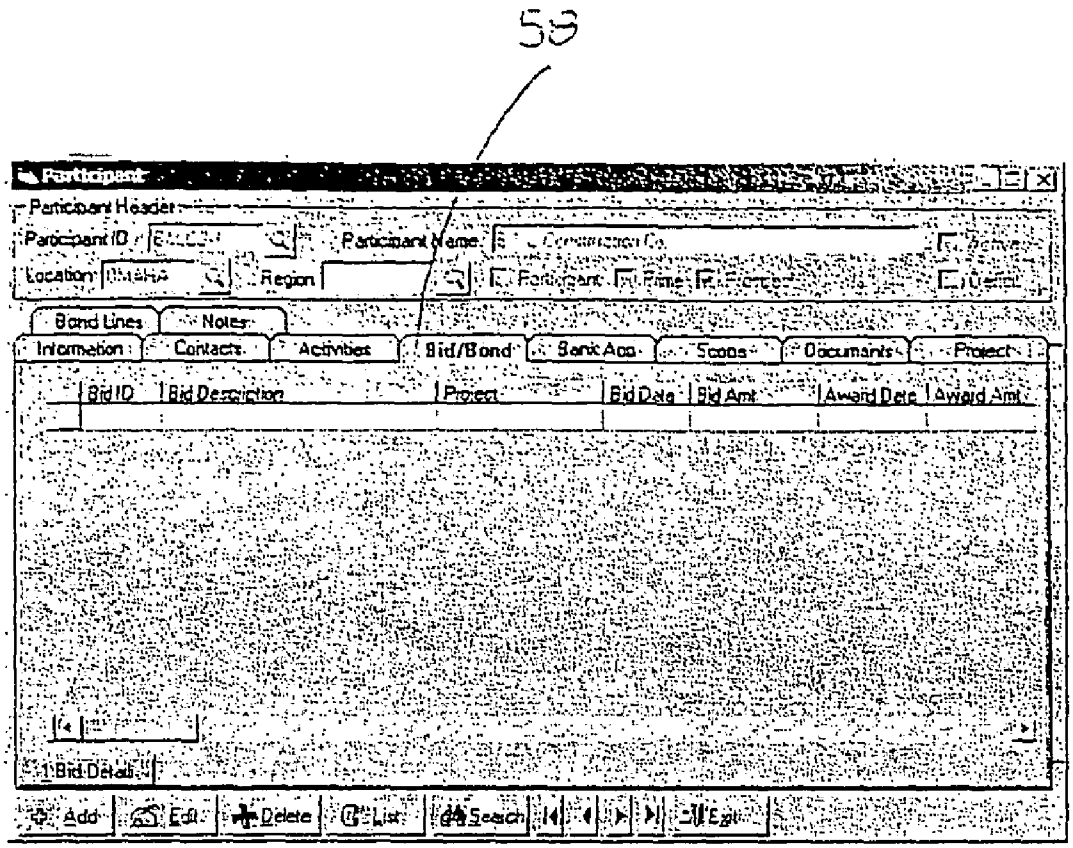
FIG. 20 depicts one possible embodiment of the bid/bond category of the contractor interface.
Figure 21:
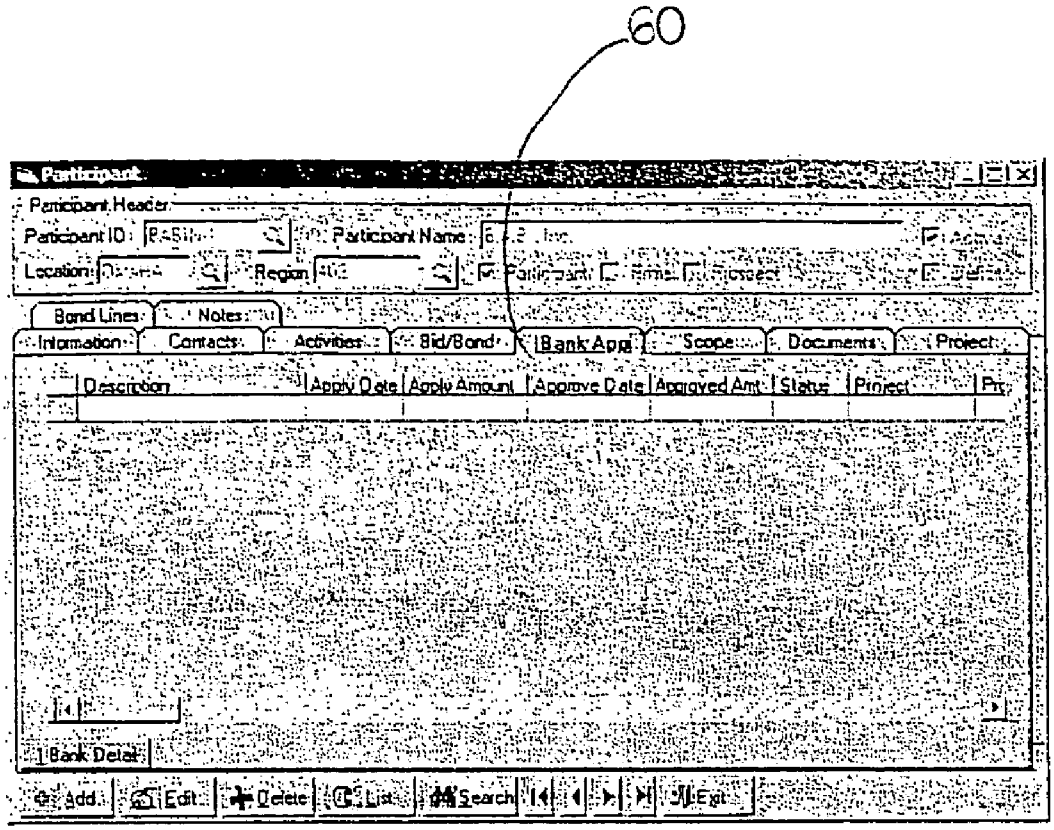
FIG. 21 depicts one possible embodiment of the finance category of the contractor interface.
Figure 22:
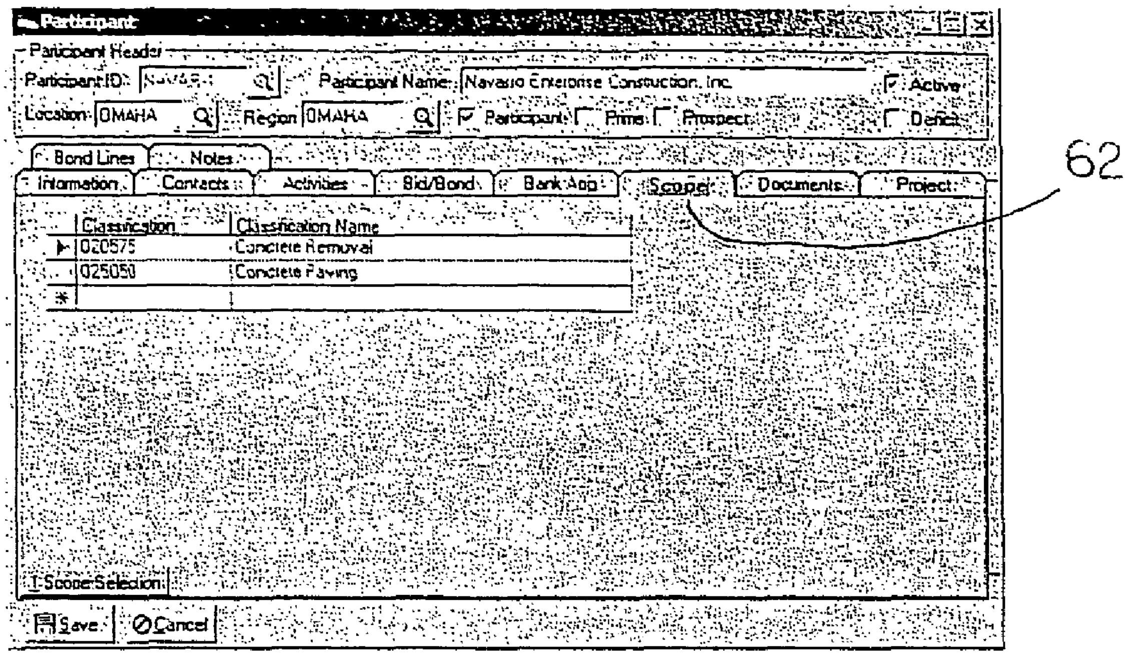
FIG. 22 depicts one possible embodiment of the scope category of the contractor interface.
Figure 23:
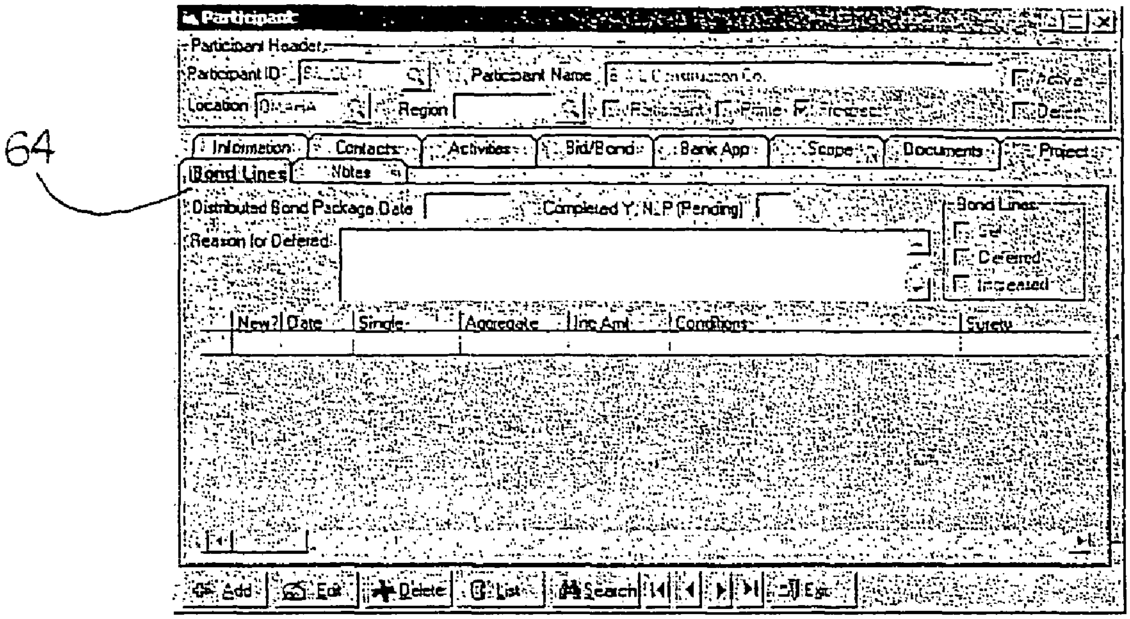
FIG. 23 depicts one possible embodiment of the bond category of the contractor interface.
Figure 24:
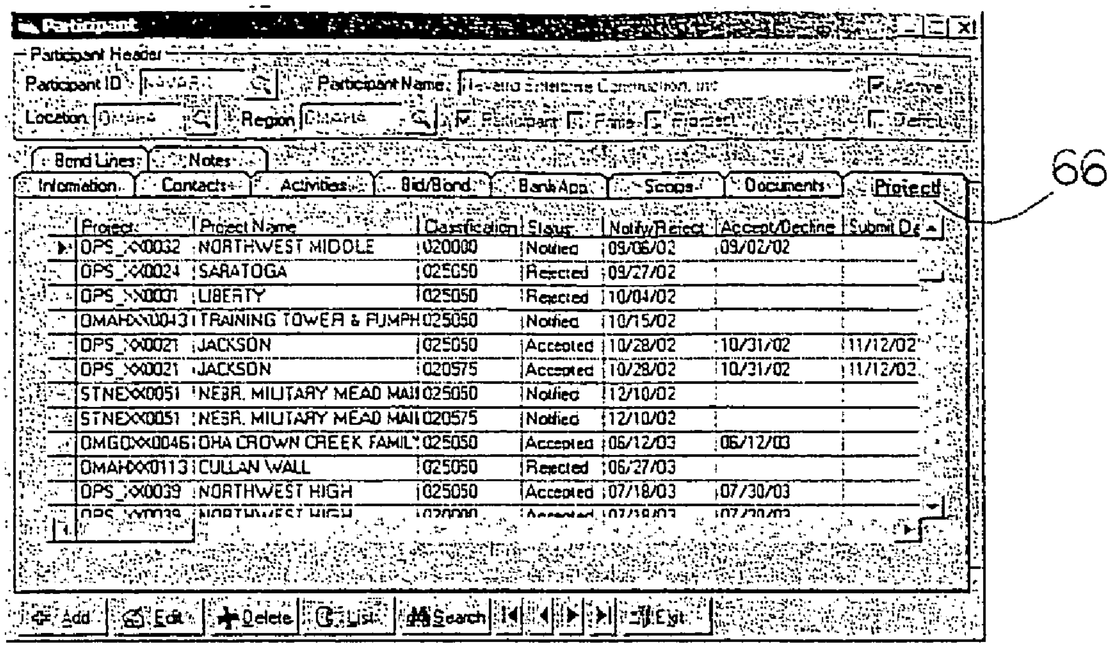
FIG. 24 depicts one possible embodiment of the project category of the contractor interface.

FIG. 5 generally shows the project/construction support 18 that the program 10 provides. During initial processing 108, the user may access the project support display and retrieve project data 110 from the project database 22 or retrieve contractor data 112 from the contractor database 24. A user may enter a project overview 114 or status updates 116 into the project database 22. The program 10 will then generate notifications 122 and 124, respectively, and transmit the notifications to the owner. Similarly, a user may input scheduling updates 118 or change orders 120 into the contractor database 24. The program 10 will then notify the contractor as indicated by reference numbers 126 and 128, respectively.

A person of skill in the art will realize that the types of construction support the program 10 could provide are vast. For example, the program could generate reports and notifications of project status, environmental issues, change orders, scheduling or cost analysis. These notifications could be provided to a plurality of contractors, financial institutes, respective tenants or government agencies.

In use, a person of skill in the art will realize a variety of internal and external network configurations for the program 10. However, in at least one configuration, the program 10 is utilized on a stand-alone personal computer and a database manager has access to the program 10. In such a situation, the owner and contractors would relay information to the database manager and the database manager would input information pertaining to the program 10. The program 10 may also be utilized on an intranet or closed network. In such a situation, one or more database managers may have access to the program 10. Each database manager may manage a certain portion of the program 10.

In yet another embodiment, the program 10 may be utilized on the world wide web or an open network system. The database manager, owner and contractor may all have controlled and secured access to at least a portion of the program 10 by direct access, through a network connection or through a router. For example, an owner may log onto a server which implements a platform corresponding to program 10 and have secured access to the owner and project databases. A contractor may have controlled and secured access to the contractor database. Also, the database manager may have access to all or a portion of the program 10 which requires further management. In this manner, much of the interaction and management of the program 10 can take place automatically and virtually on a platform through an open computer network.

Thus, it can be seen that the invention accomplishes at least all of its stated objectives. The above specification, examples and data provide a complete description of the assembly and use of preferred embodiments of the system of the present invention. Since many embodiments of the invention can be made without departing from the spirit and scope of the invention, the invention resides in the claims hereinafter appended.

I claim:

1. A system for facilitating a project between owners and contractors, the system comprising;

a user interface having at least a processor, a data storage means, an input device and a display device; and a program operative on said processor for:

(a) receiving owner data for at least one owner;

(b) receiving project data for at least one project;

(c) determining a project rating for said at least one unperformed project;

(d) receiving contractor data for a plurality of contractors;

(e) determining a contractor rating for each of said plurality of contractors using said contractor data; contractor bond capacity and contractor loan capacity at least two factors used in determining the contractor rating:

(f), comparing the contractor rating for each of said plurality of contractors with the project rating for said at least one unperformed project;

(g) identifying contractors having a contractor rating that is compatible with said project rating; and (h) providing bond acquisition support by at least submitting, and tracking the status of bonding applications for the contractor;

(i) providing project finance support by at least submitting, and tracking the status of, financing applications for the contractor.

2. The system of claim 1 wherein said program is further operative on said processor to automatically generate project notifications during predetermined intervals of said at least one project.

3. The system of claim 2 wherein said program is further operative on said processor to automatically transmit said project notifications.

4. The system of claim 3 wherein said project notifications are electronic notifications.

5. The system of claim 3 wherein said project notifications are facsimile notifications.

6. The system of claim 3 wherein said project notifications are printed notifications automatically generated by a priming means.

7. The system of claim 3 wherein said predetermined interval includes a bid interval and said project notification includes a bid letting notification.

8. The system of claim 3 wherein said predetermined interval includes a bid acceptance interval and said project notification includes a bid acceptance notification.

9. The system of claim 1 wherein at least one factor of said contractor rating is a competency classification.

10. The system of claim 9 wherein said program is further operative on said processor to provide a hierarchy of selectable competency classifications as one factor of said contractor rating.

11. The system of claim 1 wherein said program is further operative on said processor for providing bid letting support.

12. The system of claim 1 wherein said program is further operative on said processor for providing project scheduling assistance.

13. The system of claim 1 wherein said program is further operative on said processor for providing project construction support.

14. The system of claim 1 wherein said program is further operative on said processor for providing project scheduling assistance.

15. The system of claim 14 wherein said program is further operative on said processor for providing project construction support.

16. The system of claim 1 further rising a network; said program being operative on said network.

17. The system of claim 16 wherein a database manager has access to at least a portion of said program.

18. The system of claim 16 wherein at least one owner has access to at least a portion of said program.

19. The system of claim 16 wherein said contractor has access to at least a portion of said program.

20. A memory for storing data for access by an application program being executed on a data processing system, comprising:

a data structure stored in said memory, said data structure including:

(a) owner data for at least one owner;

(b) project data for at least one unperformed project; and (c) contractor data for a plurality of contractors; said application program accessing said data structure for determining:

(i) a project rating for said at least one project;

(ii) a contractor rating for each of said plurality of contractors using said contractor data; contractor bond capacity and contractor loan capacity being at least two factors used in determining the contractor rating; and (iii) at least one compatible contractor rating and project rating after comparing the contractor rating for each of said plurality of contractors with the project rating for said at least one unperformed project.

21. A system for identifying at least one compatible contractor and project, the system comprising:

a server computer hosting a program for:

(a) receiving owner data for at least one owner;

(b) receiving project data for at least one unperformed project;

(c) determining a project rating for said at least one project;

(d) receiving contractor data for a plurality of contractors;

(e) determining a contractor rating for each of said plurality of contractors using said contractor data; contractor bond capacity and contractor loan capacity being at least two factors used in determining the contractor rating;

(f) comparing the contractor rating for each of said plurality of contractors with the project rating for said at least one unperformed project; and and (g) identifying contractors having a contractor rating that is compatible with said owner project rating;

said server operative to provide a platform having:

(i) an owner data input prompt;

(ii) a project data input prompt; and (iii) a contractor data input prompt;

at least one user interacting with at least a portion of said platform to generate at least one project rating and at least one contractor rating;

said program identifying contractors having a contractor rating that is compatible with said project rating.

22. The system of claim 21 wherein at least one user is a contractor interacting with said contractor data input prompt.

23. The system of claim 21 wherein at least one user is an owner interacting with said owner data input prompt.

24. The system of claim 21 wherein at least one user is an owner interacting with said project data input prompt.

25. The system of claim 21 wherein at least one user is a database manager.

* * * * *